(12) United States Patent
Sato et al.

(10) Patent No.: US 6,344,955 B1
(45) Date of Patent: Feb. 5, 2002

(54) SYSTEM AND METHODS FOR PROVIDING A MAGNETORESISTIVE ELEMENT HAVING AN IMPROVED LONGITUDINAL BIAS MAGNETIC FIELD

(75) Inventors: Jun-ichi Sato; Fumihiro Hiromatsu, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/348,285

(22) Filed: Jul. 7, 1999

(30) Foreign Application Priority Data

Jul. 8, 1998 (JP) .......................................... 10-193362

(51) Int. Cl.[7] ................................................. G11B 5/39
(52) U.S. Cl. .................................................. 360/327.32
(58) Field of Search ......................... 360/327.32, 327.3, 360/327.31, 327.33

(56) References Cited

U.S. PATENT DOCUMENTS

| | | |
|---|---|---|
| 4,103,315 A | 7/1978 | Hempstead et al. |
| 4,663,685 A | 5/1987 | Tsang |
| 5,018,037 A | 5/1991 | Krounbi et al. |
| 5,206,590 A | 4/1993 | Dieny et al. |
| 5,528,440 A | 6/1996 | Fontana et al. |

FOREIGN PATENT DOCUMENTS

| | | |
|---|---|---|
| JP | A 7-210834 | 8/1995 |
| JP | A 7-244821 | 9/1995 |

OTHER PUBLICATIONS

Ching Tsang et al., Design, Fabrication & Testing of Spin–Valve Read Heads for High Density Recording, IEEE Translations on Magnetics, vol. 30, No. 6, Nov. 1994, pp. 3801–3806.

Primary Examiner—George J. Letscher
(74) Attorney, Agent, or Firm—Oliff & Berridge, PLC

(57) ABSTRACT

A magnetoresistive element comprising a magnetic sensitive film responding to a magnetic field applied from the outside and a magnetic domain control film applying a bias magnetic field to said magnetic sensitive film in the longitudinal direction in which a sense current flows, wherein in case of assuming that the minimum magnetical thickness of said magnetic domain control film determined in consideration of the minimum magnetic field Hmin required for operation, of a longitudinal bias magnetic field applied to said magnetic sensitive film is $\alpha$ (gauss-$\mu$m), the magnetical thickness x (gauss-$\mu$m) of the magnetic sensitive film given by the product of the remnant magnetization Br1 (gauss) of said magnetic sensitive film and its film thickness THx ($\mu$m), and the magnetical thickness y (gauss-$\mu$m) of the magnetic domain control film given by the product of the film thickness THy ($\mu$m) of said magnetic domain control film and its remnant magnetization Br2 (gauss) are set so as to meet "$y=-2x+\alpha$". And it is preferable that the relation between the magnetical thickness x (gauss-$\mu$m) of said magnetic sensitive film and the magnetical thickness y (gauss-$\mu$m) of said magnetic domain control film are set so as to meet almost "$y=-2x+\alpha$" or "$-2x+1.1\alpha>=y>=-2x+0.9\alpha$".

19 Claims, 9 Drawing Sheets

FIG._1
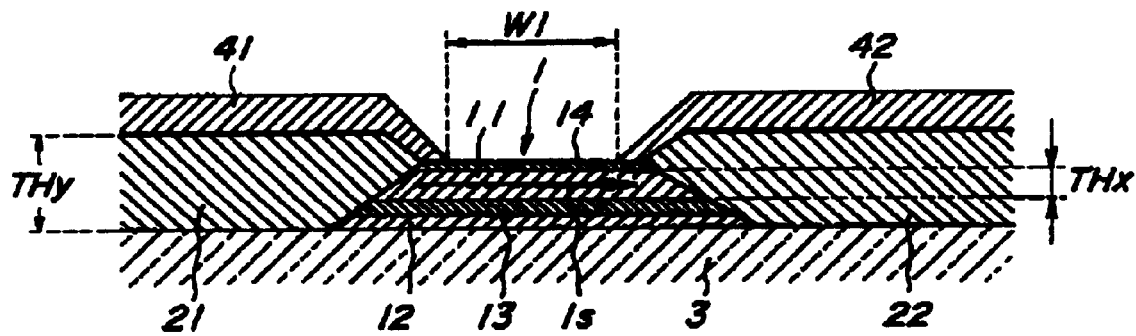
FIG._2
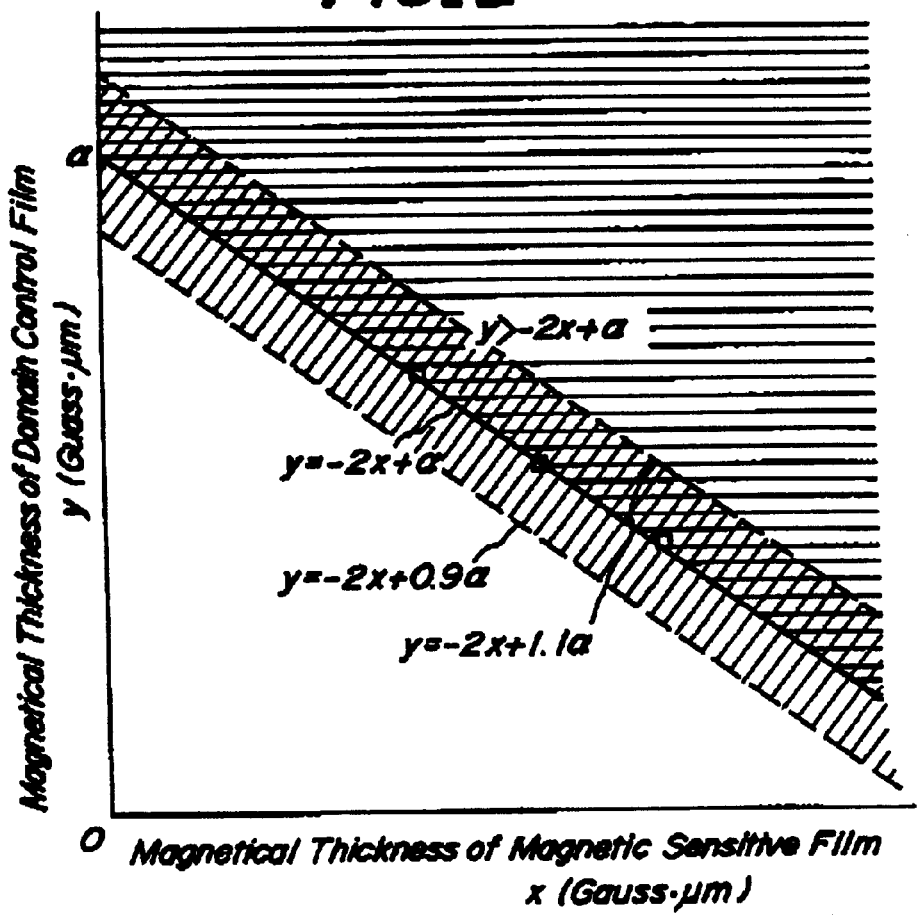

SYSTEM AND METHODS FOR PROVIDING A MAGNETORESISTIVE ELEMENT HAVING AN IMPROVED LONGITUDINAL BIAS MAGNETIC FIELD

BACKGROUND OF THE INVENTION

1. Field of the Invention

The present invention relates to a magnetoresistive element using a magnetoresistance effect and a thin film magnetic head comprising the magnetoresistive element.

2. Related Art Statement

Under a tendency of miniaturization of a magnetic disk drive unit, a thin film magnetic head using a magnetoresistive element (hereinafter, referred to as an MR element also) as a read head is known as a magnetic/electric converter suitable for reading information stored in a high recording density on a magnetic medium since its output is not related to the relative speed of the head to a magnetic disk.

As an MR element used in such a thin film magnetic head, an MR element using an anisotropic magnetoresistance effect film (hereinafter, referred to as an AMR film) made of permalloy and the like, and a gigantic magnetoresistive element (hereinafter, referred to as a GMR element) using a spin valve film structure (hereinafter, referred to as an SV film structure) are known. These MR elements each contain a magnetic sensitive film responding to a magnetic field applied from the outside. In case of an AMR element an AMR film corresponds to the magnetic sensitive film, and in case of a GMR element of a spin valve structure a free layer corresponds to the magnetic sensitive film. A longitudinal bias magnetic field (a single domain anisotropic magnetic field) is applied to the magnetic sensitive film by a magnetic domain control film. This longitudinal bias magnetic field makes the magnetic sensitive film into a single magnetic domain and suppresses a Barkhausen noise to be caused by movement of a domain wall. As a method for applying a longitudinal bias magnetic field, an exchange bias method utilizing the exchange coupling between an antiferromagnetic film and a magnetic film, and a hard magnetic bias method using a hard magnetic film are known.

For example, an exchange bias method is disclosed in Japanese Patent Laid-Open Publication No. Sho 62-40,610 and U.S. Pat. No. 4,103,315. The respective magnetic domain control films in an MR element disclosed in these prior technical documents are stacked with a space between them on both sides being opposite to each other of an AMR film to be a magnetic sensitive film. A magnetic domain control film comprises an antiferromagnetic film. And utilizing an exchange coupling generated between an antiferromagnetic film and a magnetic film, this method applies a uniform longitudinal bias magnetic field to the AMR film to make it into a single magnetic domain and thereby prevents a Barkhausen noise to be caused by movement of a magnetic domain.

The specification of U.S. Pat. No. 5,528,440 discloses an exchange bias method which makes a magnetic domain control film have a film structure generating an exchange coupling by forming an antiferromagnetic film of an NiMn layer on an NiFe layer and brings an end portion of this magnetic domain control film into contact with an AMR film.

Japanese Patent Laid-Open Publication No. Hei 7-244, 821 discloses a technique which removes an antioxidizing film on the surface of an AMR element layer by cutting by a specified amount both end portions in the longitudinal direction of the AMR element, forms an antiferromagnetic film in an area where an exchange coupling can be generated, generates an exchange coupling between a magnetic film and the antiferromagnetic film, and applies a longitudinal bias magnetic field.

Japanese Patent Laid-Open Publication No. Hei 7-210, 834 discloses a film structure having magnetic domain control films provided on both ends in the longitudinal direction of an AMR film, wherein a buffer layer composed of an NiFe film is provided between the AMR film and the magnetic domain control film.

Further, a hard magnetic bias method has been disclosed in Japanese Patent Laid-Open Publication No. Hei 3-125, 311. In this prior technical document, hard magnetic films are formed in end passive areas at both sides of it.

A GMR element having an SV film structure is disclosed in Japanese Patent Laid-Open Publication No. Hei 4-358, 310 and IEEE TRANSACTIONS ON MAGNETICS, Vol. 30, No. 6, NOVEMBER 1994, pp. 3801–3806. This known SV film structure has basically a structure having a pin layer and a free layer stacked with a nonmagnetic layer between them. The pin layer has the direction of magnetization fixed in one direction, and the free layer has the direction of magnetization freely moving in response to a magnetic field applied from the outside. The SV film structure has the minimum resistance value when the pin layer and the free layer have the same direction of magnetization, and has the maximum resistance value when they are inverse to each other in direction of magnetization. An external magnetic field is detected by utilizing this resistance change characteristic.

In the SV film structure also, a magnetic domain control film for applying a longitudinal bias magnetic field to a free layer is provided. As a magnetic domain control film, a film structure by an exchange bias method and a film structure by a hard magnetic bias method are known.

Although a longitudinal bias magnetic field by a magnetic domain control film is necessary for making a magnetic sensitive film into a single magnetic domain, a too large longitudinal bias magnetic field degrades the reproduction sensitivity of the magnetic sensitive film. Accordingly, the intensity of a longitudinal bias magnetic field needs to be set so as to make a magnetic sensitive film into a single magnetic domain but so as not to degrade the reproduction sensitivity of the magnetic sensitive film. The intensity of a longitudinal bias magnetic field varies according to the relation between the thickness and magnetic characteristics of a magnetic sensitive film and the thickness and magnetic characteristics of a magnetic domain control film. In order to set a proper longitudinal bias magnetic field, therefore, it is necessary to clarify an influence which the thickness and magnetic characteristics of a magnetic sensitive film and the thickness and magnetic characteristics of a magnetic domain control film have upon the longitudinal bias magnetic field.

However, the above-mentioned prior technical documents have disclosed methods for applying a longitudinal bias magnetic field to a magnetic sensitive film and thereby making it into a single magnetic domain, but they do not teach at most the relation between the thickness and magnetic characteristics of a magnetic sensitive film and the thickness and magnetic characteristics of a magnetic domain control film, said relation having an influence upon the longitudinal bias magnetic field.

And in order to cope with high-density integration of an MR element, it is necessary to make thinner the thickness of a magnetic sensitive film. For example, in case of an AMR element, it is required to reduce the thickness of a magnetic sensitive film from a thickness of 20 to 25 nm at present to a thickness of 10 nm or less. The above-mentioned prior technical documents do not teach how to determine the thickness of a magnetic domain control film in case that the magnetic sensitive film is made thin as described above.

SUMMARY OF THE INVENTION

An object of the present invention is to provide a magnetoresistive element capable of applying a proper longitudinal bias magnetic field to a magnetic sensitive film according to a change in thickness of the magnetic sensitive film, and a thin film magnetic head provided with the same magnetoresistive element.

Another object of the present invention is to provide a magnetoresistive element capable of applying a proper longitudinal bias magnetic field to a magnetic sensitive film by clarifying an influence which the magnetical thickness of a magnetic sensitive film and the magnetical thickness of a magnetic domain control film have upon the longitudinal bias magnetic field, and a thin film magnetic head provided with the same magnetoresistive element.

A further other object of the present invention is to provide a magnetoresistive element capable of applying a proper longitudinal bias magnetic field to a magnetic sensitive film even in case of making thin the magnetic sensitive film, and a thin film magnetic head provided with the same magnetoresistive element.

A magnetoresistive element according to the present invention comprises a magnetic sensitive portion and a magnetic domain control film. Said magnetic sensitive portion comprises a magnetic sensitive film, and said magnetic sensitive film is a film responding to a magnetic field applied from the outside. Said magnetic domain control film is a film applying a longitudinal bias magnetic field to said magnetic sensitive film in case of assuming that the direction in which a sense current flows is the longitudinal direction. In case of assuming that a magnetical thickness given by the product of the remnant magnetization Br1 (gauss) of said magnetic sensitive film and its film thickness THx ($\mu$m) is x (gauss-$\mu$m), that a magnetical thickness given by the product of the film thickness THy ($\mu$m) of said magnetic domain control film and its remnant magnetization Br2 (gauss) is y (gauss-$\mu$m), and that the minimum magnetical thickness of said magnetic domain control film determined in consideration of the minimum magnetic field Hmin required for operation, of a longitudinal bias magnetic field to be applied to said magnetic sensitive film is $\alpha$ (gauss-$\mu$m), the present invention satisfies the following expression:

$$y >= -2x + \alpha. \quad (1)$$

Said magnetic domain control film makes a magnetic sensitive film into a single magnetic domain by applying a bias magnetic field in the longitudinal direction in which a sense current flows to said magnetic sensitive film, and as a result it can suppress a Barkhausen noise.

Next, the meaning of the above-mentioned expression (1) "$y >= -2x + \alpha$" is described. According to studies of the present inventors, a longitudinal bias magnetic field (single axis anisotropic magnetic field) to be applied to a magnetic sensitive film varies linearly in proportion to the magnetical thickness x of a magnetic sensitive film. This means that as the magnetic sensitive film becomes thinner, the single axis anisotropic magnetic field (longitudinal bias magnetic field) becomes smaller and an action of suppressing a Barkhausen noise is degraded, and that there is the minimum longitudinal bias magnetic field Hmin capable of suppressing the Barkhausen noise. Here, it is assumed that the ratio of a unit change quantity $\Delta$H1 of a longitudinal bias magnetic field to a change $\Delta$x of a magnetical thickness corresponding to the unit change quantity $\Delta$H1 is "$\Delta$H1/$\Delta$x".

In the meantime, a longitudinal bias magnetic field generated by a magnetic domain control film varies also linearly in proportion to its magnetical thickness y. Namely, as the magnetical thickness y becomes larger, the longitudinal bias magnetic field generated by the magnetic domain control film becomes larger. Here, it is assumed that the ratio of a unit change quantity $\Delta$H1 of a longitudinal bias magnetic field to a change $\Delta$y of a magnetical thickness corresponding to the unit change quantity $\Delta$H1 is "$\Delta$H1/$\Delta$y".

Paying attention to the above-mentioned characteristic, the present invention increases the magnetical thickness y of a magnetic domain control film and increases a longitudinal bias magnetic field generated in the magnetic domain control film when the magnetical thickness x of a magnetic sensitive film becomes smaller and its longitudinal bias magnetic field is lowered. By this, the invention compensates for lowering of a longitudinal bias magnetic field caused by decrease of the magnetical thickness x of a magnetic sensitive film. Since magnetical thickness x and y each are the product of a film thickness and a remnant magnetization, the magnetical thickness x and y each can be adjusted by selecting the film thickness. Therefore, in case that the film thickness of a magnetic sensitive film has varied, it is possible to apply a proper longitudinal bias magnetic field by increasing the film thickness of a magnetic domain control film in accordance with the change in thickness of the magnetic sensitive film.

Next, according to studies of the present inventors, it has been known that the ratio "$\Delta$H1/$\Delta$x" of a unit change quantity $\Delta$H1 of a longitudinal bias magnetic field to a change $\Delta$x of a magnetical thickness corresponding to the unit change quantity $\Delta$H1 is about double the ratio "$\Delta$H1/$\Delta$y" of a unit change quantity $\Delta$H1 of a longitudinal bias magnetic field to a change $\Delta$y of the magnetical thickness corresponding to the unit change quantity $\Delta$H1.

Therefore, in case of compensating for lowering of a longitudinal bias magnetic field caused by a fact that the magnetical thickness x of a magnetic sensitive film decreases by $\Delta$x by increasing a longitudinal bias magnetic field generated in a magnetic domain control film, it is necessary to make the change $\Delta$y of the magnetical thickness y of the magnetic domain control film larger than double the change $\Delta$x of the magnetical thickness of the magnetic sensitive film. Namely, it is necessary to meet "$y >= -2x$".

Next, constant $\alpha$ in expression "$y >= -2x + \alpha$" is determined in consideration of the minimum magnetic field Hmin of a magnetic sensitive film required for operation. As described above, as a magnetic sensitive film becomes thinner, its anisotropic magnetic field becomes smaller, and finally it reaches the minimum magnetic field Hmin capable of suppressing a Barkhausen noise. The minimum magnetic field Hmin is a design value capable of being obtained by experiences or experiments. Constant $\alpha$ is given as the minimum magnetic film thickness of a magnetic domain control film capable of applying a longitudinal bias magnetic field exceeding the minimum magnetic field Hmin even in case that the magnetical thickness x of a magnetic sensitive film reaches a minimum value of zero.

According to the present invention, as described above, even in case of making thin a magnetic sensitive film, it is possible to apply a proper longitudinal bias magnetic field to the magnetic sensitive film. Hereupon, the upper limit of the magnetical thickness y of a magnetic domain control film is not set in the above-mentioned expression (1), but when the film thickness of a magnetic domain control film is made excessively large, the longitudinal bias magnetic field is made excessively large and the reproduction sensitivity is degraded, and therefore it is preferable that the value of a magnetical thickness y is set so that such a degradation in reproduction sensitivity does not occur.

In an embodiment of a magnetoresistive element according to the present invention, both ends in the longitudinal direction of a magnetic sensitive portion are made into depressions lower than the middle part of it and a magnetic domain control film is arranged on each of these depressions. In this case, the depth of the depression is set at 5 nm (50 angstroms) or more when taking the surface of the middle part of the magnetic sensitive portion as a reference plane. When the depth of the depression is set at 5 nm or more, a longitudinal bias magnetic field appears clearly.

In case of setting the depth of a depression at 5 nm or more within the film thickness of a magnetic sensitive film, it is preferable to set the magnetical thickness $\alpha$ (gauss-$\mu$m) at 450 (gauss-$\mu$m).

In another embodiment of a magnetoresistive element according to the present invention, the depression of a magnetic sensitive portion is formed so that the depth of it exceeds the film thickness of the magnetic sensitive portion. In this case, it is preferable to set the magnetical thickness a (gauss-$\mu$m) at 630 (gauss-$\mu$m).

In case of an AMR element, its magnetic sensitive film is formed out of an AMR film. In case that a magnetic sensitive portion is of an SV structure, its magnetic sensitive film is formed out of a free layer contained in the SV structure.

A magnetic domain control film may be of a structure comprising an antiferromagnetic film and a magnetic film generating an exchange coupling with the antiferromagnetic film, and may be formed out of a hard magnetic film.

In a magnetoresistive element according to the present invention, it is preferable to set the magnetical thickness x (gauss-$\mu$m) of said magnetic sensitive film and the magnetical thickness y (gauss-$\mu$m) of said magnetic domain control film so as to almost meet "$y=-2x+\alpha$", but it has been experimentally confirmed that a sufficiently practical magnetoresistive element can be obtained even in case that the value of the minimum magnetical thickness $\alpha$ of a magnetic domain control film is slipped out by +−10% from the preferable value. Therefore, in a magnetoresistive element according to the present invention, it is possible to set the magnetical thickness x (gauss-$\mu$m) of said magnetic sensitive film and the magnetical thickness y (gauss-$\mu$m) of said magnetic domain control film so as to meet the following expression:

$$-2x+1.1\alpha >= y >= -2x+0.9\alpha. \quad (2)$$

And in this case, it is preferable to set the film thickness THx ($\mu$m) of said magnetic sensitive film at a value within a range of 5 to $15\times10^{-3}$ $\mu$m.

And the present invention relates also to a method of designing a magnetoresistive element, and in case of designing a magnetoresistive element provided with a magnetic sensitive portion comprising a magnetic sensitive film formed out of a magnetic material responding to a magnetic field applied from the outside and a magnetic domain control film which is formed out of a magnetic material and applies a bias magnetic field in the longitudinal direction in which a sense current flows to said magnetic sensitive film, the invention determines the magnetical thickness x (gauss-$\mu$m) of said magnetic sensitive film given by the product of the remnant magnetization Br1 (gauss) of a magnetic material forming said magnetic sensitive film and its film thickness THx ($\mu$m), and the magnetical thickness y (gauss-$\mu$m) of said magnetic domain control film given by the product of the film thickness THy ($\mu$m) of a magnetic material forming said magnetic domain control film and the remnant magnetization Br2 (gauss) of it so as to meet the following expression:

$$y=-2x+\alpha,$$

or $$-2x+1.1\alpha >= y >= -2x+0.9\alpha,$$

in case of assuming that the minimum magnetical thickness of said magnetic domain control film determined in consideration of the minimum magnetic field Hmin required for operation, of a longitudinal bias magnetic field to be applied to said magnetic sensitive film is a (gauss-$\mu$m).

And in case of designing a magnetoresistive element, it is preferable to set the film thickness THx of said magnetic sensitive film at $15\times10^{-3}$ $\mu$m or less, particularly at a value within a range of 5 to $15\times10^{-3}$ $\mu$m and determine the magnetical thickness y (gauss-$\mu$m) of the magnetic domain control film so as to meet the above-mentioned conditions.

The present invention relates to a thin film magnetic head in which the above-mentioned magnetoresistive element is formed so as to be supported by a slider, and such a thin film magnetic head brings the above-mentioned action and effects of a magnetoresistive element according to the present invention as they are.

BRIEF DESCRIPTION OF THE DRAWINGS

FIG. 1 is a sectional view showing the structure of an embodiment of a magnetoresistive element according to the present invention, FIG. 2 is a diagram showing the relation between the magnetical thickness of a magnetic sensitive film and the magnetical thickness of a magnetic domain control film in a magnetoresistive element according to the present invention.

DETAILED DESCRIPTION OF THE PREFERRED EMBODIMENTS

Figure 3:
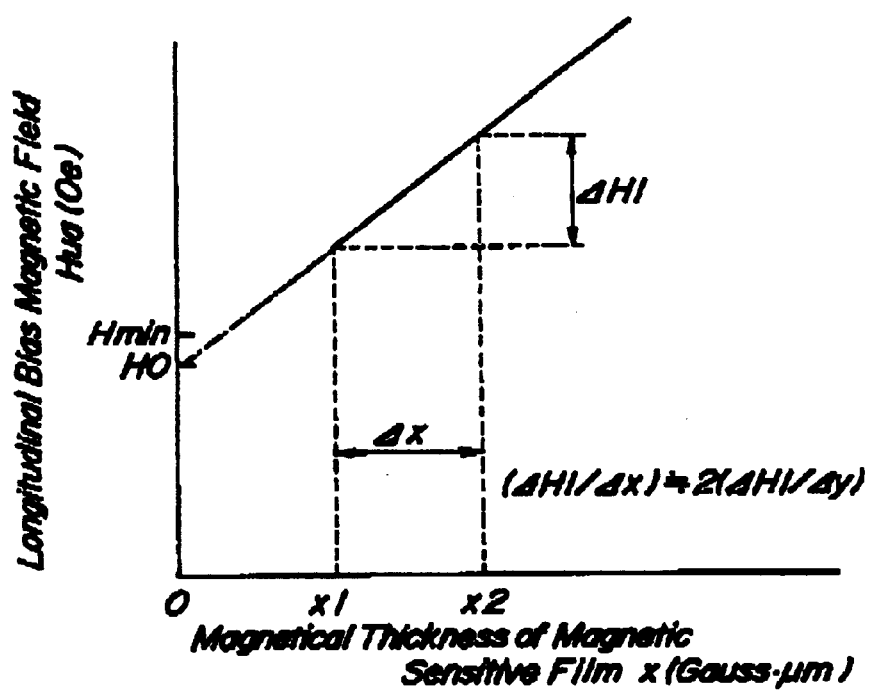
FIG. 3 is a graph showing the relation between the magnetical thickness of a magnetic sensitive film and the longitudinal bias magnetic field applied to the magnetic sensitive film in a magnetoresistive element according to the present invention.

FIG. 1 is a sectional view showing the structure of an embodiment of a magnetoresistive element according to the present invention. An MR element according to the present invention comprises a magnetic sensitive portion 1 and magnetic domain control films 21, 22 provided at both sides of it. The magnetic sensitive portion 1 comprises a magnetic sensitive film 11, which responds to a magnetic field (perpendicular to the paper plane) applied from the outside. FIG. 1 shows an AMR element and the magnetic sensitive film 11 is formed out of an AMR film of permalloy and the like. The magnetic sensitive portion 1 further comprises a lateral bias film 12 and a magnetic separation film 13.

The lateral bias film 12 is stuck on one face of a supporting member 3, and the magnetic separation film 13 is provided between the lateral bias film 12 and the magnetic sensitive film 11. Inversely to the illustration, a structure is acceptable in which the magnetic sensitive film 11 is the bottom layer (namely, the supporting member 3 side), and the magnetic separation film 13 and the horizontal bias film 12 are stacked on the magnetic sensitive film 11.

It is as described above that the magnetic sensitive film 11 is formed out of permalloy for example. Its composition, thickness, manufacturing method and the like are publicly known to people having ordinary knowledge in this technical field. It is a matter of course that not only permalloy but also another material having a large anisotropic magnetoresistance change rate can be used. An antioxidizing film 14 is formed on the surface of the magnetic sensitive film 11.

The lateral bias film 12 is a magnetic film formed out of, for example, NiFe—RH, NiFe—Cr, or amorphous soft magnetic material. A characteristic demanded on the lateral bias film 12 is mainly that it has a good soft magnetic property and a large specific resistance and does not display a magnetoresistance effect. Accordingly, materials having such a characteristic other than the above-mentioned materials can be also used.

The magnetic separation film 13 is formed out of a Cu or Ta film for example. Such a stacking structure is a structure usually used in an MR element of this kind.

The magnetic domain control films 21, 22 apply a longitudinal bias magnetic field to the magnetic sensitive film 11 in case of taking the direction in which a sense current is flows as the longitudinal direction. In the embodiment, the magnetic domain control films 21, 22 are provided respectively at both sides in the longitudinal direction of the magnetic sensitive film 11. Each of the magnetic domain control films 21, 22 may be of a stacking structure comprising an antiferromagnetic film and a magnetic film generating an exchange coupling with the antiferromagnetic film, and may be formed out of a hard magnetic film.

Lead conductor films 41, 42 are respectively stuck on the magnetic domain control films 21, 22. The lead conductor films 41, 42 each are formed out of a stacked film of Ta/W/Ta. An effective magnetic conversion area is determined by the width W1 measured in the direction along a pair of lead conductor films 41, 42.

Hereupon, in case of assuming that a magnetical thickness given by the product of the remnant magnetization Br1 (gauss) of the magnetic sensitive film 11 and its film thickness THx ($\mu$m) is x (gauss-$\mu$m), that a magnetical thickness given by the product of the film thickness THy ($\mu$m) of the magnetic domain control films 21, 22 and their remnant magnetization Br2 (gauss) is y (gauss-$\mu$m), and that the minimum magnetical thickness of the magnetic domain control films 21, 22 determined in consideration of the minimum magnetic field Hmin required for operation, of a longitudinal bias magnetic field to be applied to the magnetic sensitive film 11 is $\alpha$ (gauss-$\mu$m), the present embodiment satisfies the following expression:

$$y >= -2x+\alpha.$$

And in a magnetoresistive element according to the present invention, it is particularly preferable to set the magnetical thickness x (gauss-$\mu$m) of said magnetic sensitive film and the magnetical thickness y (gauss-$\mu$m) of said magnetic domain control film so as to meet almost "y=−2x+$\alpha$". As a result of many experiments and studies, however, it has been found that a sufficiently practical magnetoresistive element can be obtained even in case that the value of the minimum magnetical thickness $\alpha$ of a magnetic domain control film is slipped out by +−10% from the preferable value. Therefore, in a magnetoresistive element according to the present invention, it is possible to set the magnetical thickness x (gauss-$\mu$m) of said magnetic sensitive film and the magnetical thickness y (gauss-$\mu$m) of said magnetic domain control film so as to meet the following expression:

$$-2x+1.1\alpha >= y >= -2x+0.9\alpha. \quad (2)$$

And in this case, it is preferable to set the film thickness THx ($\mu$m) of said magnetic domain control film at a value within a range of 5 to 15×10$^{-3}$ $\mu$m (5 to 15 nm).

FIG. 2 shows straight lines represented by "y=−2x+$\alpha$", "y=−2x+1.1$\alpha$2" and "y=−2x+0.9$\alpha$", and areas represented by "y>=−2x+$\alpha$" and "−2x+1.1$\alpha$>=y>=−2x+0.9$\alpha$". This figure represents the magnetical thickness x (gauss-$\mu$m) of the magnetic sensitive film 11 on the axis of abscissas and represents the magnetical thickness y (gauss-$\mu$m) of the magnetic domain control films 21, 22 on the axis of ordinates.

FIG. 3 is a graph showing the relation between the magnetical thickness x of the magnetic sensitive film 11 and the longitudinal bias magnetic field Hua (Oe) applied to the magnetic sensitive film 11. It is assumed that this graph has been obtained when the magnetical thickness of the magnetic domain control films 21, 22 takes a specific value of y01. As shown in FIG. 3, the longitudinal bias magnetic field Hua applied to the magnetic sensitive film 11 varies linearly in proportion to the magnetical thickness x of the magnetic sensitive film 11. This means that as the magnetic sensitive film 11 becomes thinner, the single axis anisotropic magnetic field is smaller and an action of suppressing a Barkhausen noise is degraded, and that there is the minimum magnetic field Hmin capable of suppressing the Barkhausen noise. Here, it is assumed that the ratio of a unit change quantity $\Delta$H1 of a longitudinal bias magnetic field to a change $\Delta$x from x1 to x2 of the magnetical thickness x to corresponding to the change $\Delta$H1 is "$\Delta$H1/$\Delta$x".

Figure 4:
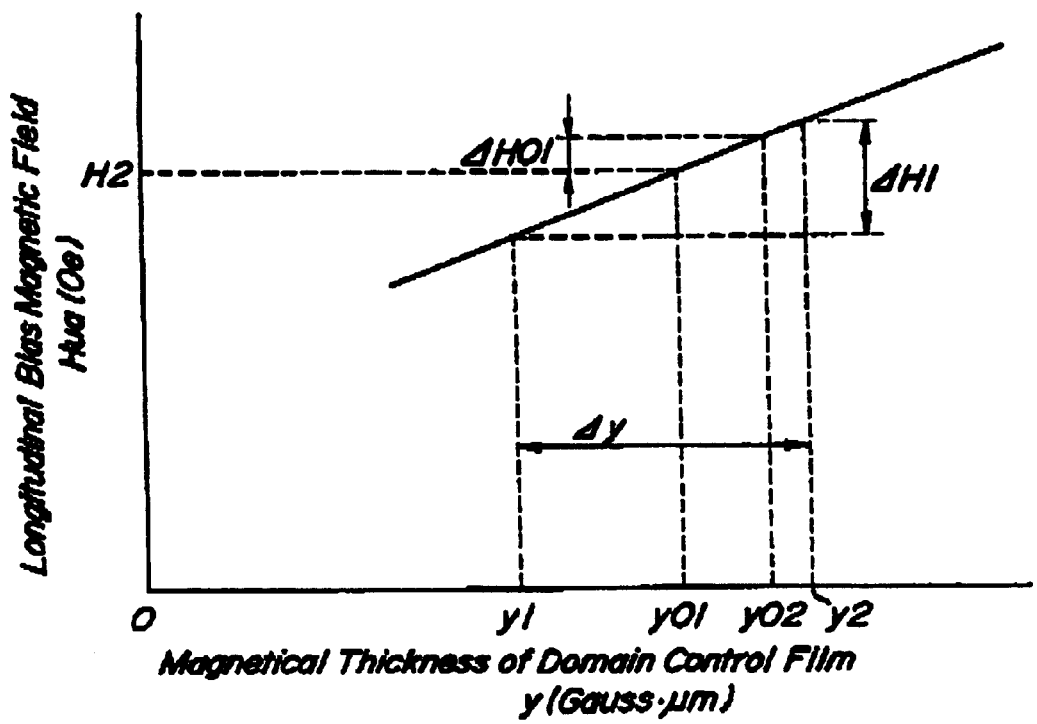
FIG. 4 is a graph showing the relation between the magnetical thickness of a magnetic domain control film and the longitudinal bias magnetic field in a magnetoresistive element according to the present invention.

FIG. 4 is a graph showing the relation between the magnetical thickness y of the magnetic domain control films 21, 22 and the longitudinal bias magnetic field Hua (Oe) generated in the magnetic domain control films 21, 22. As shown in FIG. 4, the longitudinal bias magnetic field Hua generated in the magnetic domain control films 21, 22 varies also linearly in proportion to the magnetical thickness y of them. Namely, as the magnetical thickness y becomes larger, the longitudinal bias magnetic field Hua generated in the magnetic domain control films 21, 22 becomes larger. Here, it is assumed that the ratio of a unit change quantity $\Delta H1$ of a longitudinal bias magnetic field Hua to a change $\Delta y$ from film thickness y1 to film thickness y2 of the magnetical thickness y corresponding to the change $\Delta H1$ is "$\Delta H1/\Delta y$". The unit change quantity $\Delta H1$ has the same value as the unit change quantity $\Delta H1$ of the magnetic sensitive film 11.

Paying attention to the characteristics shown in FIGS. 3 and 4, the present invention increases the magnetical thickness y of the magnetic domain control films 21, 22 and increases the longitudinal bias magnetic field Hua generated in the magnetic domain control films 21, 22 when the magnetical thickness x of the magnetic sensitive film 11 becomes smaller and the longitudinal bias magnetic field Hua is lowered. By this the present invention compensates for decrease of the longitudinal bias magnetic field Hua caused by decrease of the magnetical thickness x of the magnetic sensitive film 11. Since a magnetical thickness is the product of an actual film thickness and the remnant magnetization, the magnetical thickness can be adjusted by selecting the film thickness. Therefore, in case that the film thickness THx of the magnetic sensitive film 11 has varied, it is possible to apply a proper longitudinal bias magnetic field Hua by changing the film thickness THy of the magnetic domain control films 21, 22.

Next, as apparently seen from comparison of FIG. 3 and FIG. 4, the ratio "$\Delta H1/\Delta x$" of a unit change quantity $\Delta H1$ of a longitudinal bias magnetic field to a change $\Delta x$ of the magnetical thickness x of the magnetic sensitive film 11 corresponding to the unit change quantity $\Delta H1$ is about double the ratio "$\Delta H1/\Delta y$" of a unit change quantity $\Delta H1$ of a longitudinal bias magnetic field to a change $\Delta y$ of the magnetical thickness y of the magnetic domain control films 21, 22.

Therefore, in case of compensating for lowering of a longitudinal bias magnetic field Hua caused by a fact that the magnetical thickness x of the magnetic sensitive film decreases by $\Delta x$ by increasing the longitudinal bias magnetic field Hua generated in the magnetic domain control films 21, 22, it is necessary to make the change $\Delta y$ of the magnetical thickness y of the magnetic domain control films 21, 22 larger than double the change $\Delta x$ of the magnetical thickness of the magnetic sensitive film 11. Namely, it is necessary to meet "$y=-2x$".

Next, setting of constant $\alpha$ in expression "$y>=-2x+\alpha$" is described. In FIG. 3, as the magnetic sensitive film 11 becomes thinner, its single axis anisotropic magnetic field becomes smaller, and finally it reaches the minimum magnetic field Hmin which is the limit value capable of suppressing a Barkhausen noise. This minimum magnetic field Hmin is a design value capable of being obtained by experiences or experiments.

Next, a longitudinal bias magnetic field H0 in case of assuming that the magnetical thickness x of the magnetic sensitive film 11 is a minimum value of zero can be estimated from a proportional relation between the magnetical thickness x of the magnetic sensitive film 11 and a longitudinal bias magnetic field. Namely, in FIG. 3, it is enough to extend a straight line representing the relation between the magnetical thickness x and the vertical bias magnetic field Hua in a manner as shown by a dotted line and read the longitudinal bias magnetic field at a magnetical thickness of "x=0" as H0. In case of FIG. 3, a longitudinal bias magnetic field of H0 is lower than the minimum magnetic field Hmin which is a limit value capable of suppressing a Barkhausen noise. This means that in case of making the magnetical thickness x of the magnetic sensitive film 11 small to the vicinity of a minimum value of zero, it becomes impossible to suppress a Barkhausen noise. In order to obtain a Barkhausen noise suppressing action even in case that the magnetical thickness x is minimized, it is necessary to raise the longitudinal bias magnetic field H0 at a magnetical thickness of "x=0" to the minimum magnetic field Hmin. Next, a technique for doing so is described.

Assuming that the characteristic shown in FIG. 3 has been obtained when the magnetical thickness y of the magnetic domain control films 21, 22 meets "$y=y01$", from FIG. 4 it is concluded that the magnetic domain control films 21, 22 have applied a magnetic field H2 (Oe) corresponding to the magnetical thickness y01 to the magnetic sensitive film 11. On the other hand, from the characteristic of FIG. 3, it is known that when the magnetical thickness x of the magnetic sensitive film 11 comes to the vicinity of a minimum value of zero, this magnetic field H2 (Oe) cannot apply a longitudinal bias magnetic field larger than the minimum magnetic field Hmin to the magnetic sensitive film 11.

Thereupon, in FIG. 4, the magnetical thickness y of the magnetic domain control films 21, 22 is increased to a magnetical thickness y02 which makes it possible to obtain a change $\Delta H01$ larger than the difference between the minimum magnetic field Hmin and the magnetic field H0. The magnetical thickness y02 at this time gives constant $\alpha$ in the above-mentioned expression "$y>=-2x+\alpha$". Thanks to this, even in case of making the magnetic sensitive film 11 very thin, it is possible to apply a proper longitudinal bias magnetic field Hua larger than the minimum magnetic field Hmin to the magnetic sensitive film 11.

Figure 5:
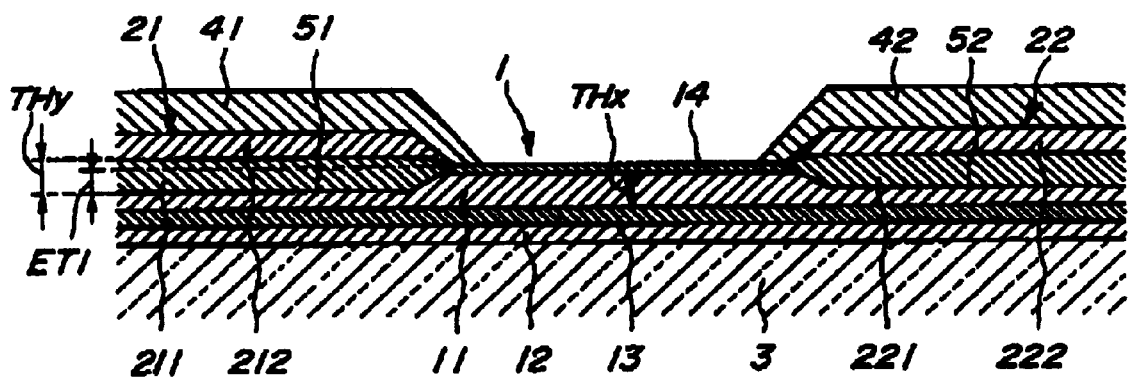
FIG. 5 is a figure showing a concrete film structure of a magnetoresistive element according to the present invention.

FIG. 5 is a sectional view showing the film structure of another embodiment of an MR element according to the present invention. In FIG. 5, the same components as those shown in FIG. 1 are given the same reference symbols as FIG. 1. This embodiment shows magnetic domain control films 21, 22 utilizing an exchange bias method.

In this embodiment, the magnetic domain control film 21 is formed by sticking an antiferromagnetic film 212 on an additional film 211 made of a permalloy film and a longitudinal bias magnetic field Hua is generated by an exchange coupling between both films 211 and 212. In the same manner, the magnetic domain control film 22 also is formed by sticking an antiferromagnetic film 222 on an additional film 221 made of a permalloy film and a longitudinal bias magnetic field Hua is generated by an exchange coupling between both films 221 and 222.

The antiferromagnetic films 212, 222 can be formed out of either of NiMn, FeMn, NiO, CoO, and $Fe_2O_3$. In the present invention, the magnetic domain control films 21, 22 can be also formed out of hard magnetic films differently from this embodiment.

The magnetic sensitive film 11 forms depressions 51, 52 at both ends in the longitudinal direction of it, said depressions 51, 52 being lower than the middle part, and the magnetic domain control films 21, 22 are arranged respectively in the depressions 51, 52. An antioxidizing film 14 is stuck on the surface of the magnetic sensitive film 11, but the antioxidizing film is removed in the depressions 51, 52 and thereby the additional films 211, 222 are brought into contact with the magnetic sensitive film 11.

Lead conductor films 41, 42 are stuck on the magnetic domain control films 21, 22. The lead conductor films 41, 42 each are formed out of a stacked film of Ta/W/Ta, for example. An effective magnetic conversion area is determined by a width W1 measured in the direction along a pair of lead conductor films 41, 42, namely, in the longitudinal direction.

In case that the magnetic domain control film 21 is of a stacking structure in which an additional film 211 and an antiferromagnetic film 212 are stacked on each other like this embodiment, the magnetical thickness y (gauss-$\mu$m) of the magnetic domain control film 21 is given by the product of the film thickness THy (gauss-$\mu$m) of the additional film 211 and the remnant magnetization Br2 (gauss) of the additional film 211. The magnetic domain control film 22 also is formed in the same way.

Next, in relation to the MR element shown in FIG. 5, the relation between the etching depth ET1 of the depressions 51, 52 and a longitudinal bias magnetic field Hua, the relation between the magnetical thickness x of the magnetic sensitive film 11 and the longitudinal bias magnetic field Hua, the relation between the magnetical thickness y of the additional films 211, 221 and the longitudinal bias magnetic field Hua, and the relation between the magnetical thickness x of the magnetic sensitive film 11 and the magnetical thickness y of the additional films 211, 221 are described.

<Relation Between Etching Depth ET1 and Longitudinal Bias Magnetic Field Hua>

In order to obtain the MR element shown in FIG. 5, a soft magnetic film of NiFeCr was formed as a lateral bias film 12 on a supporting member 3 of alumina.

Next, a Ta film to be a magnetic separation film 13 was formed on the lateral bias film 12, and then a magnetic sensitive film 11 of an AMR film made of NiFe was formed on the magnetic separation film 13. The magnetic sensitive film 11 was made to be 18 nm in thickness. Further, a Ta film of 2 nm in thickness was formed as an antioxidizing film 14 on the surface of the magnetic sensitive film 11. After this, a magnetic sensitive portion 1 of 20 $\mu$m in width and 6 $\mu$m in length was formed through a patterning process.

Next, depressions 51, 52 were formed by etching both ends of the magnetic sensitive film 11 composed of an AMR film, and NiFe films of 40 nm in thickness were formed as additional films 211, 221 in the depressions 51, 52. The etching depth ET1 of the depressions 51, 52 was variously changed.

Furthermore, antiferromagnetic films 212, 222 of NiMn were formed on the additional films 211, 221 so as to become 30 $\mu$m in thickness. Next, lead conductor films 41, 42 were formed by a lift-off method so as to become 6 $\mu$m in width. After this, the whole workpiece was covered with alumina adhered. Then, a longitudinal bias magnetic field Hua by an exchange coupling was generated in the magnetic domain control films 21, 22 by performing an annealing process.

Figure 6:
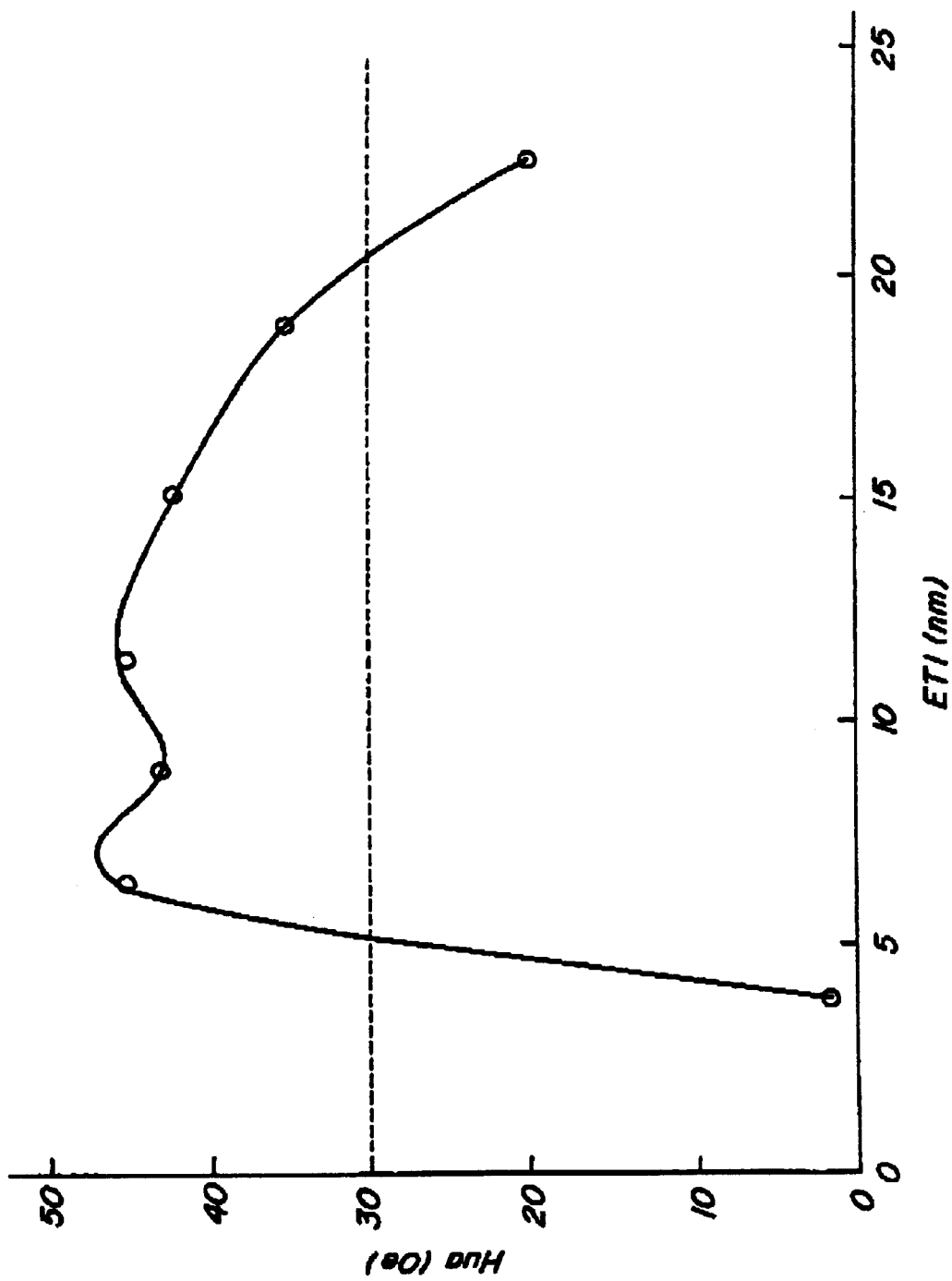
FIG. 6 is a graph showing the relation between the etching depth of a depression and the longitudinal bias magnetic field in the magnetoresistive element shown in FIG. 5.

FIG. 6 shows the relation between the etching depth ET1 of the depressions 51, 52 and a longitudinal bias magnetic field Hua. As shown in FIG. 6, when the etching depth ET1 comes near to 5 nm, the longitudinal bias magnetic field Hua increases abruptly, and a high longitudinal bias magnetic field Hua can be obtained in a range of 5 nm or more. In case of using an MR element as a read element of a thin film magnetic head, a longitudinal bias magnetic field Hua of 30 (Oe) or more is required. According to data of FIG. 6, a longitudinal bias magnetic field Hua of 30 (Oe) or more has been obtained by an etching depth of 5 nm. In case of using this as a read head of a thin film magnetic head, therefore, the etching depth is set at 5 nm or more.

As the etching depth ET1 becomes deeper, the longitudinal bias magnetic field Hua becomes gradually smaller. In case of data of FIG. 6, when the etching depth exceeds 20 nm, the longitudinal bias magnetic field Hua becomes 30 (Oe) or less.

<Relation Between Magnetical Thickness x of Magnetic Sensitive Film 11 and Longitudinal Bias Magnetic Field Hua>

In an MR element having a basic structure shown in FIG. 5, a soft magnetic film of NiFeCr was formed as a lateral bias film 12 on a supporting member 3 of alumina.

Next, a Ta film to be a magnetic separation film 13 was formed on the lateral bias film 12, and then a magnetic sensitive film 11 of an AMR film composed of NiFe was formed on the magnetic separation film 13.

Further, a Ta film of 2 nm in thickness was formed as an antioxidizing film 14 on the surface of the magnetic sensitive film 11. After this, a magnetic sensitive portion 1 of 20 $\mu$m in width and 6 $\mu$m in length was formed through a patterning process.

Next, depressions 51, 52 of 8 nm in depth were formed by etching both ends of the magnetic sensitive film 11 composed of an AMR film. NiFe films of 40 nm in thickness were formed as additional films 211, 221 in the depressions 51, 52.

Furthermore, antiferromagnetic films 212, 222 of NiMn were formed on the additional films 211, 221 so as to become 30 nm in thickness. Next, lead conductor films 41, 42 were formed by a lift-off method so as to become 6 $\mu$m in width. After this, the whole workpiece was covered with alumina adhered. Then, a longitudinal bias magnetic field Hua by an exchange coupling was generated in the magnetic domain control films 21, 22 by performing an annealing process.

In the above-described AMR element, the film thickness Tx of the magnetic sensitive film 11 was changed within a range from 10 nm to 25 nm.

Figure 7:
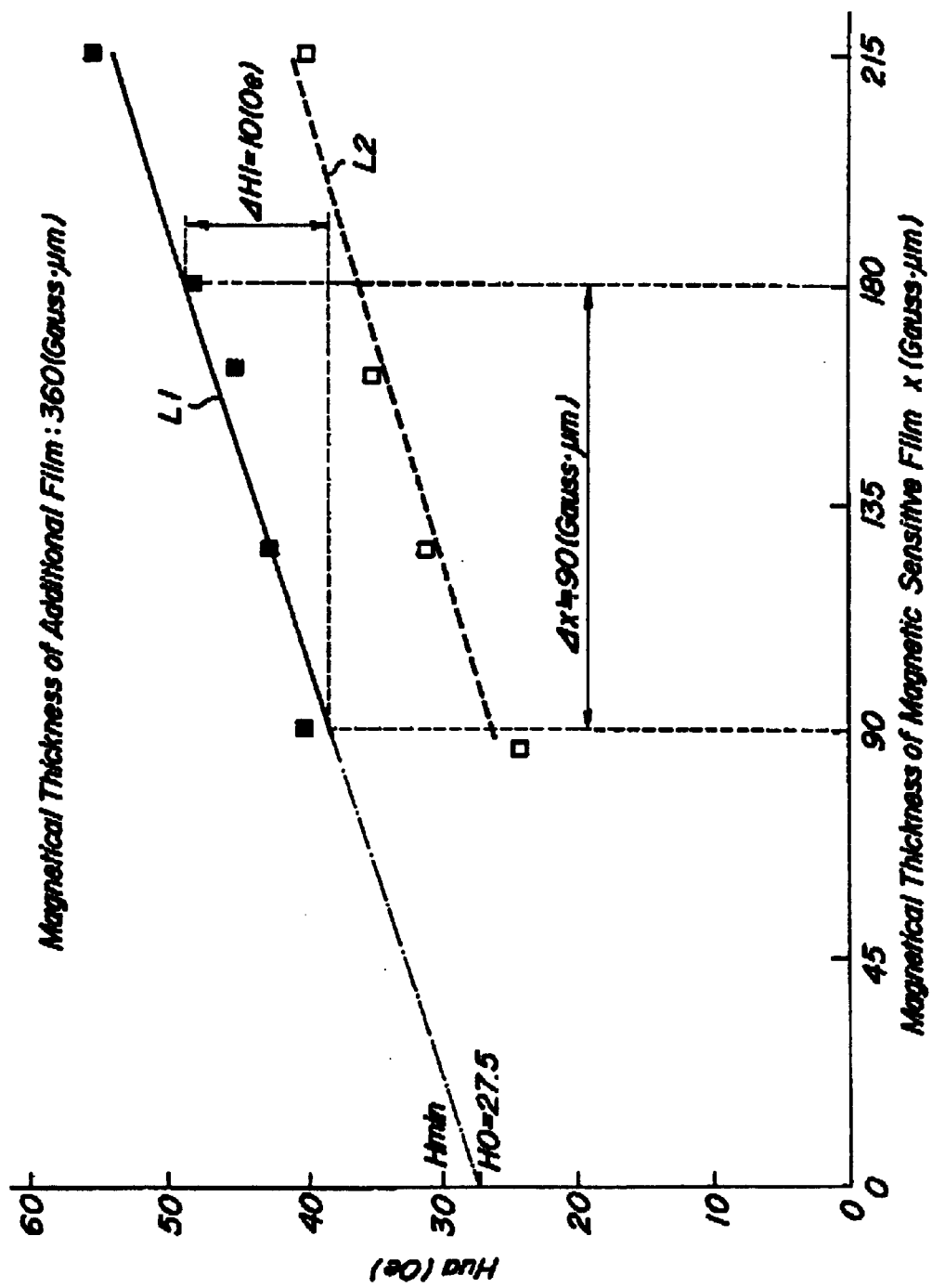
FIG. 7 is a graph showing the relation between the magnetical thickness of the magnetic sensitive film and the longitudinal bias magnetic field in the magnetoresistive element shown in FIG. 5.

FIG. 7 shows the relation between the magnetical thickness of the magnetic sensitive film 11 and a longitudinal bias magnetic field Hua. Since an AMR film of NiFe is used as the magnetic sensitive film 11, the remnant magnetization Br1 is about 9 (kilogauss). The magnetical thickness x of the magnetic sensitive film 11 is obtained as the product of the film thickness THx and this remnant magnetization Br1.

As shown in FIG. 7, the magnetical thickness x of the magnetic sensitive film 11 and the longitudinal bias magnetic field Hua are proportional to each other, and when the change $\Delta$x of the magnetical thickness x of the magnetic sensitive film 11 is about 90 (gauss-$\mu$m), the longitudinal bias magnetic field Hua varies by about 10 (Oe).

<Relation Between Magnetical Thickness y of Additional Films 211, 221 and Longitudinal Bias Magnetic Field Hua>

In an MR element having a basic structure shown in FIG. 5, a soft magnetic film of NiFeCr was formed as a lateral bias film 12 on a supporting member 3 of alumina.

Next, a Ta film to be a magnetic separation film 13 was formed on the lateral bias film 12, and then a magnetic sensitive film 11 of an AMR film composed of NiFe was formed on the magnetic separation film 13. The film thickness Tx of the magnetic sensitive film 11 was made to be 18 nm. Further, a Ta film of 2 nm in thickness was formed as an antioxidizing film 14 on the surface of the magnetic sensitive film 11. After this, a magnetic sensitive portion 1 of 20 $\mu$m in width and 6 $\mu$m in length was formed through a patterning process.

Next, depressions 51, 52 having an etching depth of 8 nm were formed by etching both ends of the magnetic sensitive film 11 composed of an AMR film. NiFe films were formed as additional films 211, 221 in the depressions 51, 52. Furthermore, antiferromagnetic films 212, 222 of NiMn were formed on the additional films 211, 221 so as to become 30 nm in thickness. Next, lead conductor films 41, 42 were formed by a lift-off method so as to become 6 μm in width. After this, the whole workpiece was covered with alumina adhered. Then, a longitudinal bias magnetic field Hua by an exchange coupling was generated in the magnetic domain control films 21, 22 by performing an annealing process.

The film thickness of the additional films 211, 221 was changed within a range from 17 nm to 60 nm.

Figure 8:
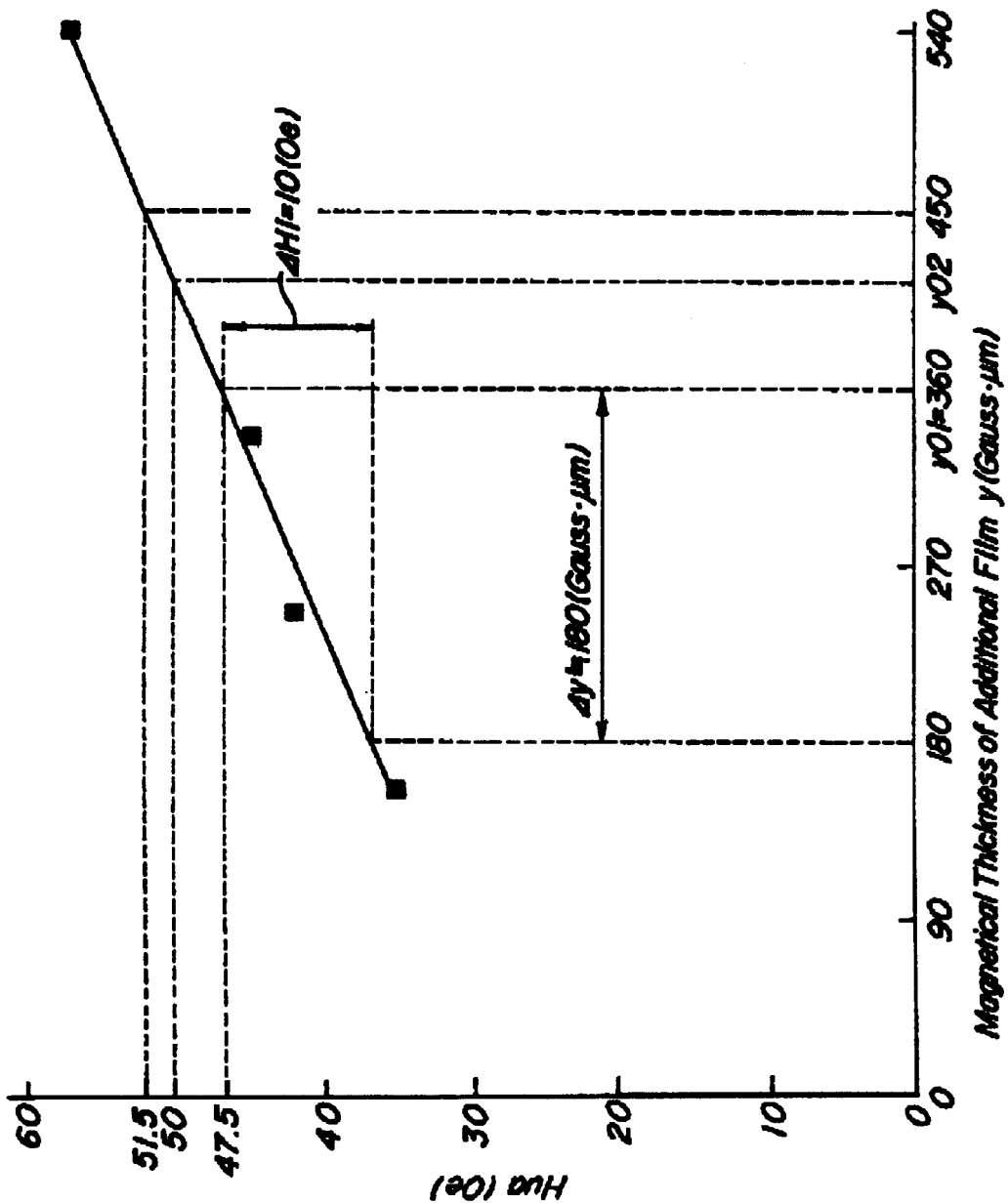
FIG. 8 is a graph showing the relation between the magnetical thickness of an additional film and the longitudinal bias magnetic field in the magnetoresistive element shown in FIG. 5.

FIG. 8 shows the relation between the magnetical thickness y of the additional films 211, 221 and a longitudinal bias magnetic field Hua. Since an NiFe film is used as the additional films 211, 221, the remnant magnetization Br2 is about 9 (kilogausses). The magnetical thickness y of the additional films 211, 221 is given as the product of an actual film thickness and this remnant magnetization Br2.

As shown in FIG. 8, the relation between the magnetical thickness y of the additional films 211, 221 and the longitudinal bias magnetic field Hua comes to be a relation that when the change Δy of the magnetical thickness y of the additional films 211, 221 is about 180 (gauss-μm), the longitudinal bias magnetic field Hua varies by about 10 (Oe).

<Relation Between Magnetical Thickness x of Magnetic Sensitive Film 11 and Magnetical Thickness y of Additional Films 211, 221>

As apparently seen from comparison of FIG. 7 and FIG. 8, the ratio "ΔH1/Δx" of a unit change quantity ΔH1 (=10 (Oe)) of a longitudinal bias magnetic field Hua to a change Δx (=90 (gauss-μm)) of the magnetical thickness x of the magnetic sensitive film 11 corresponding to the unit change quantity ΔH1 is about double the ratio "ΔH1/Δy" of a unit change quantity ΔH1 (=10 (Oe)) of a longitudinal bias magnetic field Hua to a change Δy (=180 (gauss-μm)) of the magnetical thickness y corresponding to the unit change quantity ΔH1.

Accordingly, in case of compensating for lowering of the longitudinal bias magnetic field Hua caused by a fact that the magnetical thickness x of the magnetic sensitive film 11 by increasing a longitudinal bias magnetic field Hua generated in the magnetic domain control films 21, 22, it is necessary to make a change Δy of the magnetical thickness y of the magnetic domain control films 21, 22 larger than double a change Δx of the magnetical thickness x of the magnetic sensitive film 11. Namely, it is necessary to meet "y>=−2x".

Next, setting of constant α in expression "y=−2x+α" is described. As shown in FIG. 7, as the magnetic sensitive film 11 becomes thinner, the single axis anisotropic magnetic field becomes smaller and finally reaches the minimum magnetic field Hmin which is a limit value capable of suppressing a Barkhausen noise. This minimum magnetic field Hmin is a design value capable of being known by experiences or experiments. The minimum magnetic field Hmin may be considered to be about 30 (Oe) as an MR element used in a thin film magnetic head.

Next, a longitudinal bias magnetic field H0 in case of assuming that the magnetical thickness x of the magnetic sensitive film 11 is a minimum value of zero is estimated from a proportional relation between the magnetical thickness x of the magnetic sensitive film 11 and the longitudinal bias magnetic field Hua. Namely, in FIG. 7, a longitudinal bias magnetic field Hua (=H0) in case of a magnetical thickness x (=0) is read by extending a straight line showing the relation between the magnetical thickness x and the longitudinal bias magnetic field Hua in a manner as shown by a dotted line. In case of FIG. 7, the longitudinal bias magnetic field H0 is about 27.5 (Oe) which is lower than the minimum magnetic field Hmin (=30 (Oe)) which is a limit value capable of suppressing a Barkhausen noise. This means that it is not possible to suppress a Barkhausen noise in case of making the magnetical thickness y of the magnetic sensitive film 11 small to the vicinity of a minimum value of zero. In order to obtain an action of suppressing a Barkhausen noise even in case of minimizing the magnetical thickness y, it is necessary to raise a longitudinal bias magnetic field H0 (=27.5 (Oe)) at a magnetical thickness y (=0) to a value exceeding the minimum magnetic field Hmin (=30 (Oe)). Next, a technique for doing so is described.

Characteristics of FIG. 7 have been obtained in case of the magnetical thickness y (=360 (gauss-μm)) of the additional films 211, 221. Characteristic L1 is a characteristic in case that the direction of magnetization of the magnetic domain control films 21, 22 makes an angle of 0 degree with the direction of a sense current, and characteristic L2 is a characteristic in case that the direction of magnetization of the magnetic domain control films 21, 22 makes an angle of 30 degrees with the direction of a sense current.

Describing with reference to characteristic L1, from a characteristic of FIG. 8, it is understood that the additional films 211, 221 have given a magnetic field H2 (=47.5 (Oe)) corresponding to a magnetical thickness y (=360 (gauss-"1 m)) to the magnetic sensitive film 11. From the characteristics of FIG. 7, it is understood that with this magnetic field H2 (=47.5 (Oe)) it is not possible to apply a larger magnetic field than the minimum magnetic field Hmin (=30 (Oe)) to the magnetic sensitive film 11.

Thereupon, in FIG. 8, the magnetical thickness y of the additional films 211, 221 is increased to a magnetical thickness y02 capable of giving a larger change quantity ΔH01 than 2.5 (Oe) which is the difference between minimum magnetic field Hmin (=30 (Oe)) and the magnetic field H0 (=27.5 (Oe)). The magnetical thickness y02 at this time gives constant α in the above-mentioned expression "y>=−2x+α".

According to data of FIG. 8, the magnetical thickness y02 is smaller than 450 (gauss-μm), but the magnetical thickness y02 is set at 450 (gauss-μm) in consideration of safety. By doing so, even in case of making the magnetic sensitive film 11 thin, a proper longitudinal bias magnetic field Hua exceeding the minimum magnetic field Hmin (=30 (Oe)) can be applied to the magnetic sensitive film 11. In relation to characteristic L2, it is necessary to make the magnetical thickness y02 thicker.

In another embodiment according to the present invention, the depressions 51, 52 can be formed so as to exceed the film thickness of the magnetic sensitive film 11. In this case, as shown in FIG. 6, a longitudinal bias magnetic field Hua may become smaller than the minimum magnetic field Hmin (=30 (Oe)). In order to compensate for this, it is desirable to set the magnetical thickness α (gauss-μm) at 630 (gauss-μm). In this case, expression "y>=−2x+α" is represented as:

$$y>=-2x+630 \text{ (gauss-}\mu\text{m)}.$$

Figure 9:
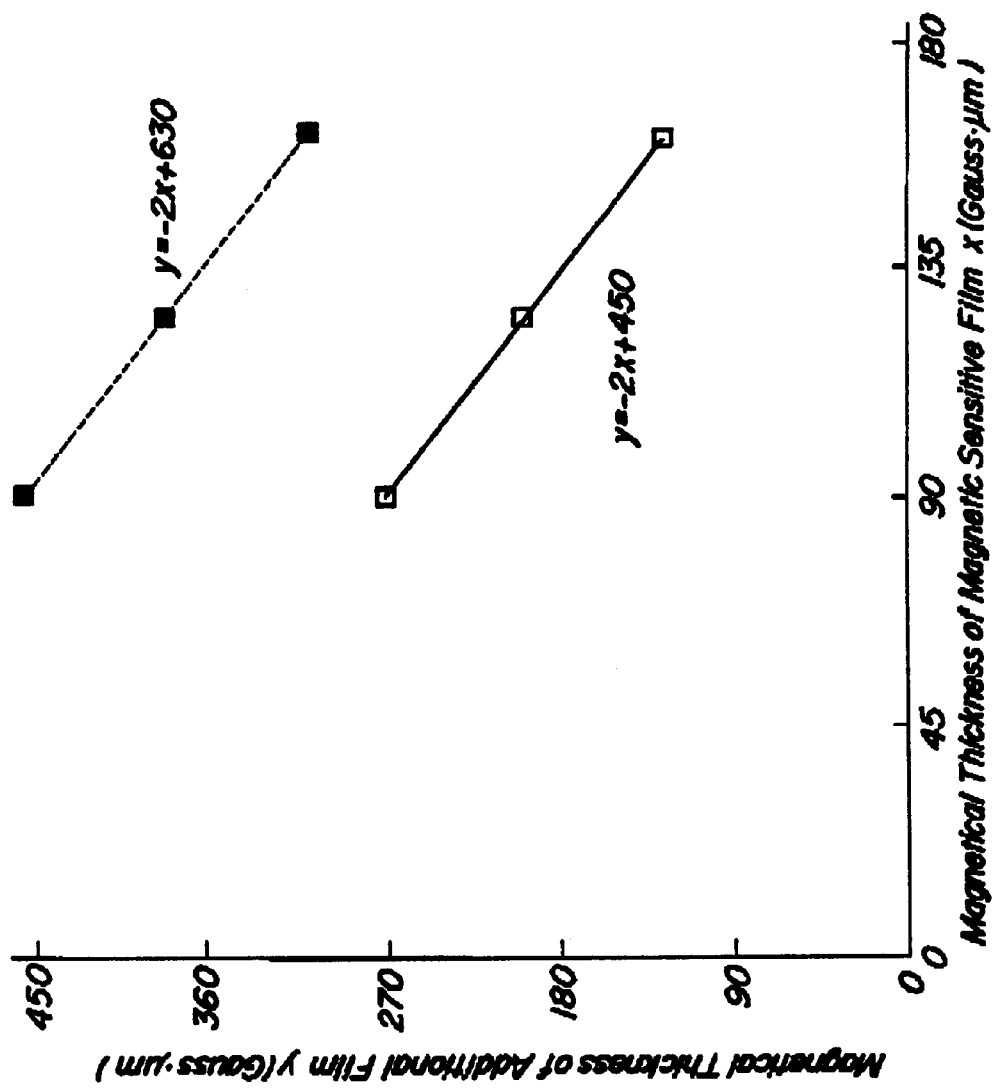
FIG. 9 is a graph showing the relation between the magnetical thickness of the magnetic sensitive film and the magnetical thickness of the additional film in the magnetoresistive element shown in FIG. 5.

FIG. 9 is a graph showing the relation between the magnetical thickness x of the magnetic sensitive film 11 and the magnetical thickness y of the additional films 211, 221, and shows two expressions "y=−2x+450" and "y=−2x+630" obtained in a manner as described above. Conditions to be satisfied in the present invention are:

$$y>=-2x+450 \text{ (gauss-}\mu\text{m)},$$

and $$y>=-2x+630 \text{ (gauss-}\mu\text{m)}.$$

Figure 10:
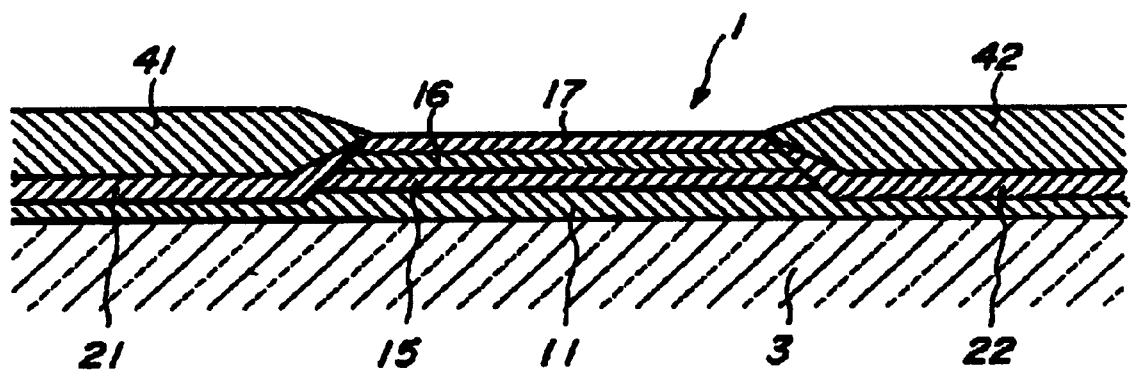
FIG. 10 is a figure showing another embodiment of a magnetoresistive element according to the present invention using a spin valve structure.

FIG. 10 shows an MR element according to the present invention using a spin valve film. A magnetic sensitive portion 1 has a spin valve structure. A spin valve film is formed by stacking one after another a magnetic sensitive film 11, a nonmagnetic film 15, a ferromagnetic film 16 and an antiferromagnetic film 17. Due to the above-mentioned structure, the ferromagnetic film 16 (pin layer) being in contact with the antiferromagnetic film 17 is in a state where it is magnetized in a fixed direction.

Magnetic domain control films 21, 22 are joined respectively to both ends in the longitudinal direction of the magnetic sensitive film 11. The magnetic domain control films 21, 22 may be of a structure containing an antiferromagnetic film and a magnetic film generating an exchange coupling with the antiferromagnetic film, and may be formed out of a hard magnetic film. CoPt, CoPtCr or the like can be used as the hard magnetic film.

In case that an external magnetic field is applied, the direction of magnetization of the magnetic sensitive film 11 which is a free layer turns according to the intensity of the external magnetic field. The resistance value of a spin valve film is determined by an angle which the direction of magnetization of the magnetic sensitive film 11 makes with the direction of magnetization of the ferromagnetic film 16 which is a pin layer. The resistance value of the spin valve film becomes the maximum when the direction of magnetization of the magnetic sensitive film 11 is inverse to the direction of magnetization of the ferromagnetic film 16, and becomes the minimum when both of these directions are the same. The resistance change rate in this case varies according to selection of materials, thickness of layers and the like.

Figure 11:
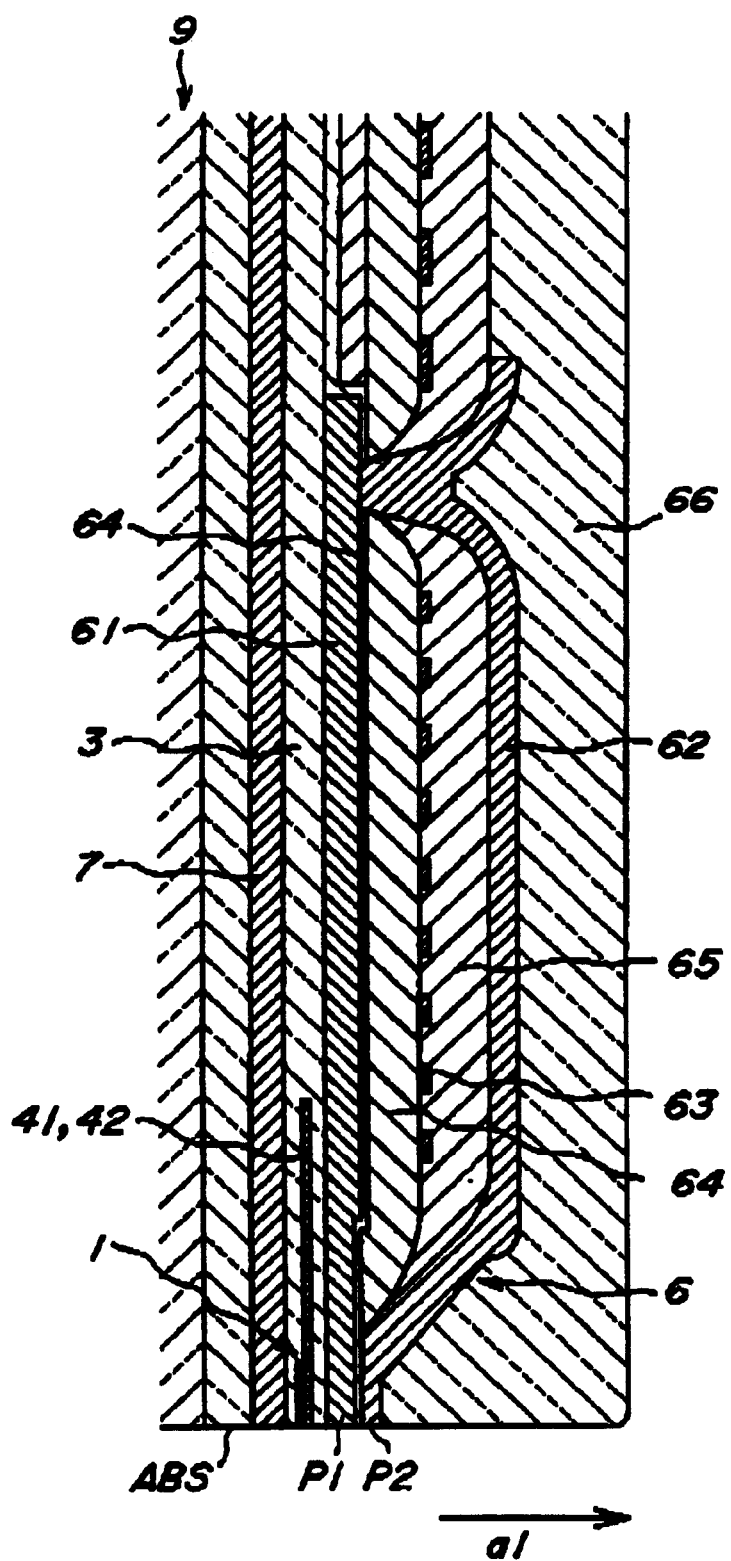
FIG. 11 is a sectional view of a thin film magnetic head using a magnetoresistive element according to the present invention.

FIG. 11 is a magnified sectional view of a thin film magnetic head using the above-mentioned MR element as a read element and using an induction-type MR element as a write element. The illustrated thin film magnetic head comprises a read element 1 formed out of an MR element utilizing a magnetoresistance effect and a write element 6 formed out of an induction-type MR element on a slider 9.

The slider 9 is provided with a substrate formed out of ceramic such as $Al_2O_3$—TiC or the like, and an insulating film of $Al_2O_3$, $SiO_2$ or the like formed on the substrate. The slider 9 has an air bearing surface (hereinafter referred to as an ABS) at one surface side facing a magnetic disk. As the slider 9, in addition to a type which is provided with a rail part at a side facing a magnetic disk and utilizes the surface of the rail part as an ABS, a type which forms a surface facing a magnetic disk into a flat surface having no rail part and utilizes almost the whole flat surface as an ABS and other types are known.

The magnetoresistive element 1 for reading is buried in the shape of layers inside an insulating film 3, and is formed out of the above-mentioned magnetoresistive element according to the present invention. Thanks to this, an action and effects of a magnetoresistive element according to the present invention are displayed in a thin film magnetic head as they are. Reference symbol 7 is a lower shielding film, which is formed out of a magnetic film of permalloy or the like.

The induction-type thin film magnetic head element 6 for writing comprises a first magnetic film 61, a second magnetic film 62, a coil film 63, a gap film 64 of alumina or the like, an insulating film 65 formed out of organic resin such as novolac resin or the like, and a protective film 66 and the like, which are stacked on the insulating film 3. The end portions of the first magnetic film 61 and the second magnetic film 62 form respectively pole portions P1 and P2 facing each other with the very thin gap film 64 between them, and a write operation is performed in the pole portions P1 and P2. The first magnetic film 61 and the second magnetic film 62 are joined with each other in a back gap part which is a yoke portion of the first and second magnetic films 61, 62 and is at the reverse side to the pole portions P1 and P2 so as to complete a magnetic circuit. The thin film coil 63 is formed around the back gap part on the insulating film 65.

In the above-mentioned embodiment, a composite-type thin film magnetic head for horizontal recording and reproduction has been formed but a composite-type thin film magnetic head for vertical recording and reproduction can be also formed. Furthermore, said composite-type thin film magnetic head has been formed as a normal type in which a magnetoresistive element for reading is formed on a substrate and further an induction-type thin film magnetic head element for writing is formed on it, but a reverse type in which these elements are formed in the reverse order can be also formed.

As described above, according to the present invention, the following effects can be obtained.
(a) In case of changing the film thickness of a magnetic sensitive film, since it is possible to provide a useful guideline for determining the magnetical thickness of a magnetic domain control film according to that change so as to apply a proper longitudinal bias magnetic field, a magnetoresistive element can be easily designed.
(b) Since an influence which the magnetical thickness of a magnetic sensitive film and the magnetical thickness of a magnetic domain control film have upon a longitudinal bias magnetic field has been clarified, it is possible to easily and exactly provide a magnetoresistive element capable of applying a proper longitudinal bias magnetic field to the magnetic sensitive film and a thin film magnetic head using the same magnetoresistive element.
(c) Even in case of miniaturizing a magnetoresistive element and making the film thickness of a magnetic sensitive film thinner than $15 \times 10^{-3}$ µm, particularly thinner than $10 \times 10^{-3}$ µm in order to realize a high horizontal recording density, it is possible to provide a magnetoresistive element being capable of applying a proper longitudinal bias magnetic field to the magnetic sensitive film and thereby being capable of suppressing a Barkhausen noise and satisfactorily detecting a very small change in an external magnetic field, and provide a thin film magnetic head, particularly, a composite-type thin film magnetic head using the same magnetoresistive element.

What is claimed is:
1. A magnetoresistive element comprising a magnetic sensitive portion having a magnetic sensitive film formed out of a magnetic material responding to a magnetic field applied from the outside, and a magnetic domain control film which is formed out of a magnetic material and applies a bias magnetic field to said magnetic sensitive film in the longitudinal direction in which a sense current flows, wherein the magnetical thickness of the magnetic sensitive film given by the product of the remnant magnetization Br1 (gauss) of the material forming said magnetic sensitive film and its film thickness THx (µm) is x (gauss-µm), the magnetical thickness of the magnetic domain control film given by the product of the film thickness Thy (µm) of the material forming said magnetic domain control film and its remnant magnetization Br2 (gauss) is y (gauss-µm), and the minimum magnetical thickness of said magnetic domain control film determined in consideration of the minimum magnetic field Hmin required for operation, of a longitudinal bias magnetic field applied to said magnetic sensitive film is α (gauss-µm), said magnetoresistive element satisfies:

$$y \geq -2x+\alpha.$$

2. A magnetoresistive element according to claim 1, wherein the film thickness THx ($\mu$m) of said magnetic sensitive film is $15\times10^{-3}$ $\mu$m or less.

3. A magnetoresistive element according to claim 1, wherein said magnetic domain control film comprises an antiferromagnetic film and a magnetic film generating an exchange coupling with this antiferromagnetic film.

4. A magnetoresistive element according to claim 1, wherein said magnetic domain control film comprises a hard magnetic film.

5. A magnetoresistive element according to claim 1, wherein said magnetic sensitive portion has both ends which are depressions lower than its middle part and these depressions are 5 nm or more in depth in case of taking the surface of said middle part as its reference level, and said magnetic domain control films are arranged respectively in said depressions.

6. A magnetoresistive element according to claim 5, wherein said depressions each have a depth within the film thickness of said magnetic sensitive portion, and the magnetical thickness $\alpha$ (gauss-$\mu$m) of said magnetic sensitive film is 450 (gauss-$\mu$m).

7. A magnetoresistive element according to claim 5, wherein said depressions each are formed so as to exceed the film thickness of said magnetic sensitive portion, and the minimum magnetical thickness $\alpha$ (gauss-$\mu$m) of said magnetic sensitive film is 630 (gauss-$\mu$m).

8. A magnetoresistive element according to claim 1, wherein said magnetic sensitive film comprises a magnetic anisotropic magnetoresistance effect film.

9. A magnetoresistive element according to claim 1, wherein said magnetic sensitive portion has a spin valve structure and is a free layer contained in said spin valve structure.

10. A magnetoresistive element comprising a magnetic sensitive portion having a magnetic sensitive film formed out of a magnetic material responding to a magnetic field applied from the outside, and a magnetic domain control film which is formed out of a magnetic material and applies a bias magnetic field to said magnetic sensitive film in the longitudinal direction in which a sense current flows, wherein the magnetical thickness of the magnetic sensitive film given by the product of the remnant magnetization Br1 (gauss) of the material forming said magnetic sensitive film and its film thickness THx ($\mu$m) is x (gauss-$\mu$m), the magnetical thickness of the magnetic domain control film given by the product of the film thickness THy ($\mu$m) of the material forming said magnetic domain control film and its remnant magnetization Br2 (gauss) is y (gauss-$\mu$m), and the minimum magnetical thickness of said magnetic domain control film determined in consideration of the minimum magnetic field Hmin required for operation, of a longitudinal bias magnetic field applied to said magnetic sensitive film is $\alpha$ (gauss-$\mu$m), said magnetoresistive element satisfies:

$$-2x+1.1\alpha \geq y \geq -2x+0.9\alpha.$$

11. A magnetoresistive element according to claim 10, wherein the film thickness THx ($\mu$m) of said magnetic sensitive film is 5 to $15\times10^{-3}$ $\mu$m.

12. A thin film magnetic head comprising a substrate and a magnetoresistive element supported by this substrate, wherein said magnetoresistive element is defined in one of claim 1.

13. A thin film magnetic head according to claim 12, being provided with said magnetoresistive element as a read element and an induction-type thin film magnetic head element as a write element, said read and write elements being supported by said substrate.

14. A thin film magnetic head according to claim 13, wherein said magnetoresistive element is disposed between said substrate and said induction-type thin film magnetic head element.

15. A method for designing a magnetoresistive element comprising a magnetic sensitive portion having a magnetic sensitive film formed out of a magnetic material responding to a magnetic field applied from the outside, and a magnetic domain control film which is formed out of a magnetic material and applies a bias magnetic field to said magnetic sensitive film in the longitudinal direction in which a sense current flows, wherein the minimum magnetical thickness of said magnetic domain control film determined in consideration of the minimum magnetic field Hmin required for operation, of a longitudinal bias magnetic field applied to said magnetic sensitive film is $\alpha$ (gauss-$\mu$m), said method determines;

the magnetical thickness x (gauss-$\mu$m) of the magnetic sensitive film given by the product of the remnant magnetization Br1 (gauss) of the material forming said magnetic sensitive film and its film thickness THx ($\mu$m), and the magnetical thickness y (gauss-$\mu$m) of the magnetic domain control film given by the product of the film thickness THy ($\mu$m) of the material forming said magnetic domain control film and its remnant magnetization Br2 (gauss) so as to meet:

$$y \geq -2x+\alpha.$$

16. A method for designing a magnetoresistive element according to claim 15, said method setting the film thickness THx ($\mu$m) of said magnetic sensitive film at a value of about $15\times10^{-3}$ $\mu$m or less and determining the magnetical thickness y (gauss-$\mu$m) of the magnetic domain control film so as to meet said condition.

17. A method for designing a magnetoresistive element comprising a magnetic sensitive portion having a magnetic sensitive film formed out of a magnetic material responding to a magnetic field applied from the outside, and a magnetic domain control film which is formed out of a magnetic material and applies a bias magnetic field to said magnetic sensitive film in the longitudinal direction in which a sense current flows, wherein the minimum magnetical thickness of said magnetic domain control film determined in consideration of the minimum magnetic field Hmin required for operation, of a longitudinal bias magnetic field applied to said magnetic sensitive film is $\alpha$ (gauss-$\mu$m), said method determines;

the magnetical thickness x (gauss-$\mu$m) of the magnetic sensitive film given by the product of the remnant magnetization Br1 (gauss) of the material forming said magnetic sensitive film and its film thickness THx ($\mu$m), and the magnetical thickness y (gauss-$\mu$m) of the magnetic domain control film given by the product of the film thickness THy ($\mu$m) of the material forming said magnetic domain control film and its remnant magnetization Br2 (gauss) so as to meet:

$$-2x+1.1\alpha \geq y \geq -2x+0.9\alpha.$$

18. A method for designing a magnetoresistive element according to claim 17, said method setting the film thickness THx ($\mu$m) of said magnetic sensitive film at a value within a range of 5 to 15×10$^{-3}$ $\mu$m and determining the magnetical thickness y (gauss-$\mu$m) of the magnetic domain control film so as to meet said condition.

19. A method for designing a magnetoresistive element according to claim 17, said method determining the magnetical thickness x (gauss-$\mu$m) of said magnetic sensitive film and the magnetical thickness y (gauss-$\mu$m) of said magnetic domain control film so as to meet almost "y=−2x+$\alpha$".

* * * * *